United States Patent
Kumar et al.

(10) Patent No.: US 9,623,354 B2
(45) Date of Patent: Apr. 18, 2017

(54) SYSTEM FOR EXTRACTING MATTER THROUGH VARIABLE BLEED VALVES IN TURBINES

(71) Applicant: General Electric Company, Schenectady, NY (US)

(72) Inventors: Anurag Kumar, Clifton Park, NY (US); Byron Andrew Pritchard, Loveland, OH (US); Chiong Siew Tan, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 716 days.

(21) Appl. No.: 14/086,683

(22) Filed: Nov. 21, 2013

(65) Prior Publication Data
US 2015/0139775 A1    May 21, 2015

(51) Int. Cl.
*B01D 45/08* (2006.01)
*F02C 9/18* (2006.01)
*F01D 9/04* (2006.01)

(52) U.S. Cl.
CPC ............. *B01D 45/08* (2013.01); *F01D 9/041* (2013.01); *F02C 9/18* (2013.01)

(58) Field of Classification Search
CPC ............. F05D 2270/096; F01D 17/105; F04D 27/009; B01D 45/08
See application file for complete search history.

(56) References Cited

U.S. PATENT DOCUMENTS

| | | | |
|---|---|---|---|
| 3,397,517 A | 8/1968 | De Vigan | |
| 3,638,428 A | 2/1972 | Shipley et al. | |
| 3,979,903 A | 9/1976 | Hull et al. | |
| 4,463,552 A | 8/1984 | Monhardt et al. | |
| 4,715,779 A * | 12/1987 | Suciu | F01D 17/105 251/229 |
| 4,791,783 A | 12/1988 | Neitzel | |
| 4,881,367 A | 11/1989 | Flatman | |
| 5,123,240 A | 6/1992 | Frost et al. | |
| 5,279,109 A | 1/1994 | Liu et al. | |
| 6,499,285 B1 | 12/2002 | Snyder | |
| 7,367,178 B2 | 5/2008 | Shibata | |
| 7,927,408 B2 | 4/2011 | Sheoran et al. | |

* cited by examiner

*Primary Examiner* — Eric Keasel
*Assistant Examiner* — Cameron Corday
(74) *Attorney, Agent, or Firm* — John P. Darling

(57) ABSTRACT

A system for extracting foreign matter in a gas turbine includes multiple variable bleed valve (VBV) doors disposed on the outer engine casing between a low pressure compressor and a high pressure compressor for bleeding a portion of flow from a core engine flow path into a bypass flow path. The system includes an outlet guide vane (OGV) assembly having multiple guide vanes disposed within the core flow path and multiple support struts positioned downstream from the multiple guide vanes. Each pairs of adjacent support struts comprises at least one VBV door therebetween and a section of the OGV assembly located at an upstream side of the fan hub frame before the each pairs of adjacent support struts. Each section of the OGV assembly includes a first side with one or more guide vanes with trimmed trailing edges configured for directing flow into the at least one VBV door.

24 Claims, 10 Drawing Sheets

SYSTEM FOR EXTRACTING MATTER THROUGH VARIABLE BLEED VALVES IN TURBINES

BACKGROUND

The present technology relates generally to gas turbine engines and, more specifically, to a system and method for extracting foreign matter through variable bleed valves in gas turbine engines.

Gas turbine engines typically include a compression system, which may consist of a single compressor or multiple compressors rotating at different speeds, for compressing a working fluid, such as air. The compressed air is channeled into a combustor wherein it is mixed with fuel and ignited to generate combustion gases which are channeled to a turbine. The turbine extracts energy from the combustion gasses to power the compressor, as well as to produce useful work to propel an aircraft in flight, or power a load, such as an electrical generator or a ship propeller. The compression system includes variable bleed valves (VBVs) disposed in a fan hub frame having doors that open to provide a bleed path to bleed off compressed air between a booster (low pressure compressor) and a core engine compressor for extracting foreign matter such as sand, ice and the like. Many known compressors include an outlet guide vane (OGV) assembly. Outlet guide vanes have airfoil-like cross sections across which fluids from core engine flow path flows prior to entering the variable bleed valves (VBVs), where a portion of fluids from the core engine flow path bleeds off into a bypass flow path for extraction of foreign particles. The problem associated with conventional bleed valve ducts and valve doors is that larger particles and amounts of particles such as sand, ice and the like are often not sufficiently drawn into the bleed duct. This may further cause erosion and generate stresses in compressor vanes and blades.

There is therefore a desire for a system and method for an enhanced technique for extracting foreign matter in the core engine flow path through variable bleed valves in gas turbine engines.

BRIEF DESCRIPTION

In accordance with an example of the technology, a system for extracting foreign matter in a gas turbine includes a core engine flow path bounded by an inner engine casing and an outer engine casing forming an annular compressor discharge. The system also includes multiple variable bleed valve (VBV) doors disposed on the outer engine casing of a fan hub frame between a low pressure compressor and a high pressure compressor for bleeding a portion of flow from the core engine flow path into a bypass flow path for extracting foreign particles. Further, the system includes an outlet guide vane (OGV) assembly including multiple guide vanes that are circumferentially-spaced and disposed within the core flow path proximate to a downstream side of the low pressure compressor, wherein each pairs of adjacent support struts comprises at least one VBV door therebetween and a section of the OGV assembly located at an upstream side of the fan hub frame before the each pairs of adjacent support struts. The section of the OGV assembly includes a first side with one or more guide vanes with trimmed trailing edges configured for directing flow into the at least one VBV door without impacting the one or more guide vanes at the first side.

In accordance with an example of the technology, a gas turbine includes a core engine flow path bounded by an inner engine casing and an outer engine casing forming an annular compressor discharge. The gas turbine also includes multiple variable bleed valve (VBV) doors disposed on the outer engine casing of a fan hub frame between a low pressure compressor and a high pressure compressor for bleeding a portion of flow from the core engine flow path into a bypass flow path for extracting foreign particles, wherein each of the multiple valves comprises one or more segments operating at one or more stroke positions. The gas turbine further includes an outlet guide vane (OGV) assembly including multiple guide vanes that are circumferentially-spaced and disposed within the core flow path proximate to a downstream side of the low pressure compressor. Furthermore, the gas turbine includes multiple circumferentially-spaced support struts positioned downstream from the multiple guide vanes configured for supporting the fan hub frame, wherein each pairs of adjacent support struts comprises at least one VBV door therebetween and a section of the OGV assembly located at an upstream side of the fan hub frame before the each pairs of adjacent support struts.

In accordance with an example of the technology, a method includes directing a fluid flow from a core engine flow path through a plurality of sections of an outlet guide vane (OGV) assembly situated downstream of a low pressure compressor; wherein each of the plurality of sections of the OGV assembly comprises a first side with one or more guide vanes with trimmed trailing edges. The method also includes directing a portion of the fluid flow into a variable bleed valve (VBV) disposed between the low pressure compressor and a high pressure compressor in a fan hub frame into an extraction passage through a bypass flow path for extracting foreign particles; wherein the fan hub frame comprises a plurality of circumferentially-spaced support struts positioned downstream from the plurality of sections of the OGV assembly.

DRAWINGS

These and other features, aspects, and advantages of the present technology will become better understood when the following detailed description is read with reference to the accompanying drawings in which like characters represent like parts throughout the drawings, wherein.

DETAILED DESCRIPTION

When introducing elements of various embodiments of the present technology, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed examples.

Figure 1:
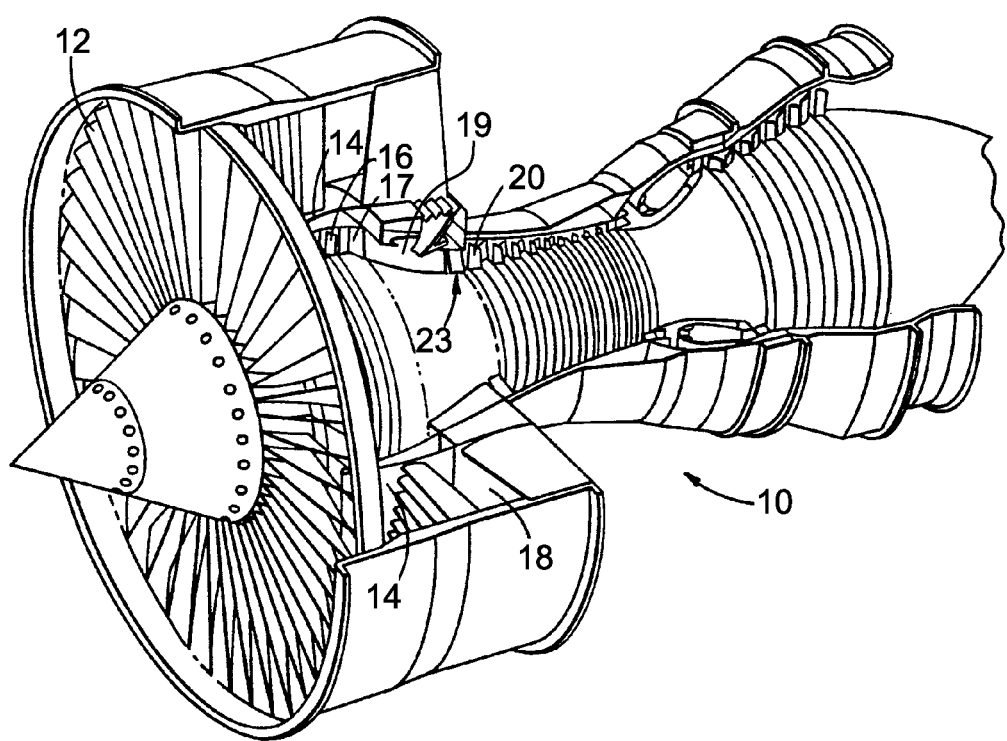
FIG. 1 shows a partial cut away of a perspective schematic representation of a typical gas turbine engine in accordance with an example of the present technology.

In FIG. 1, a perspective schematic representation of a gas turbine engine 10 is shown partially in cut away in accordance with an example of the present technology. In major portions, this engine includes a fan section 12, a separator 14, a low pressure compressor or booster 16, a bypass section 18 and a high pressure compressor 20. The engine 10 also includes a fan hub frame 19 between a low pressure compressor outlet 17 and a high pressure compressor inlet 23.

Figure 2:
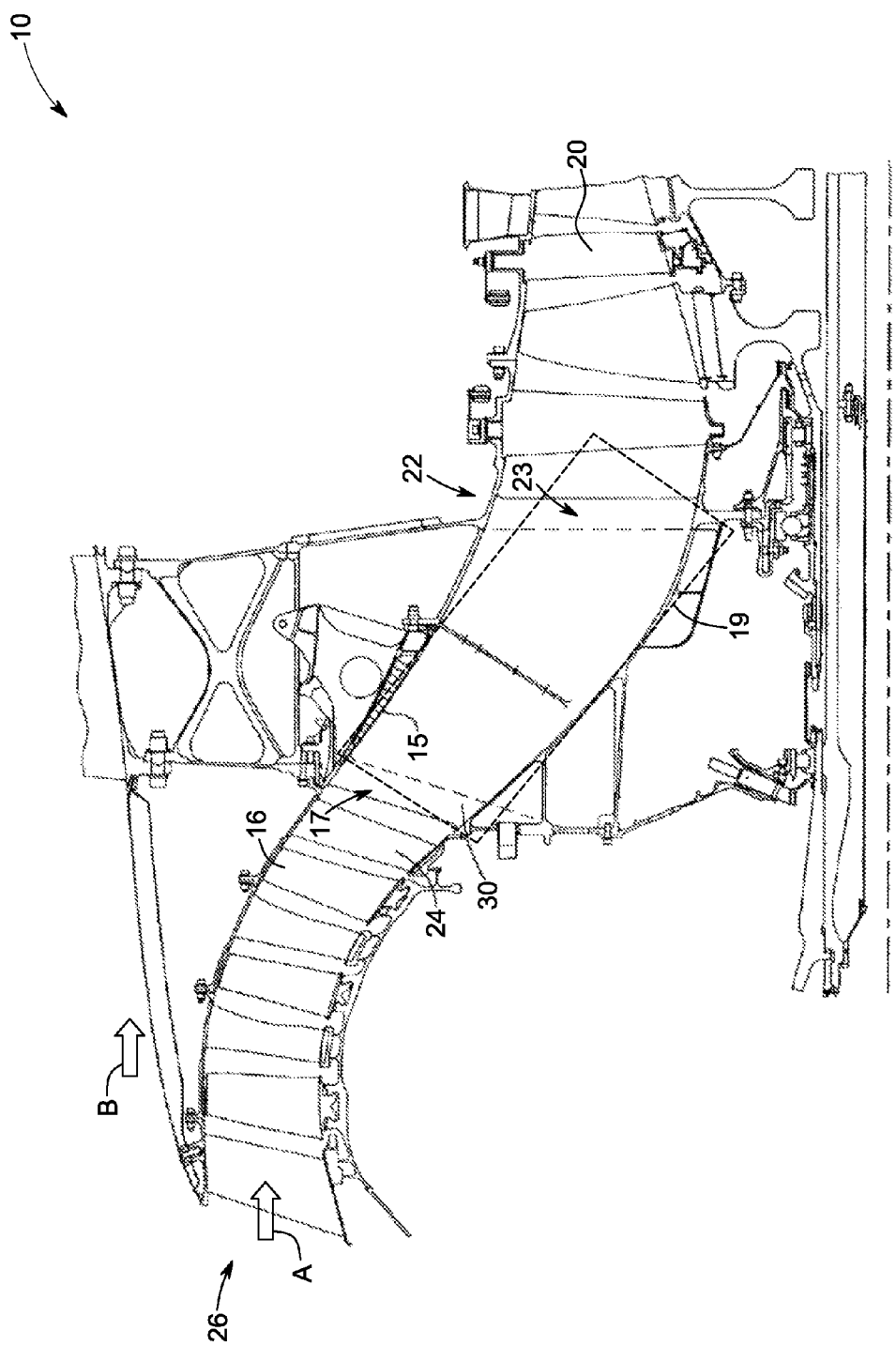
FIG. 2 is a schematic view of the gas turbine engine having the booster or low pressure compressor and a core engine flow path in accordance with an example of the present technology.

FIG. 2 is a schematic view of the gas turbine engine 10 having the booster or low pressure compressor 16 and a core engine flow path 22 in accordance with an embodiment of the present invention. The core engine flow path 22 is bounded by an inner engine casing and an outer engine casing forming an annular compressor discharge. The fan hub frame 19 as shown in a dotted loop includes a variable bleed valve (VBV) door 15 situated between the low pressure compressor outlet 17 and the high pressure compressor inlet 23 to allow a portion of the core air and debris to leave the core. Ice ingestion tests have shown however, that bleed valve doors can become restricted and/or blocked with accreted ice and the preferred operation of the doors can become impaired. Further, the gas turbine engine 10 may include multiple VBV doors 15 disposed on the outer engine casing of the fan hub frame 19 between the low pressure compressor 16 and the high pressure compressor 20 for bleeding a portion of flow from the core engine flow path 22 into the bypass section 18 (as shown in FIG. 1) having a bypass flow path for extracting foreign particles. Each of the multiple VBV doors 15 includes operable doors which can be mechanically opened by a bleed valve torque drive rod (not shown) which can be driven by the engine 10 and controlled by an appropriate sensing mechanism. Arrow A indicates the primary or core engine flow path and arrow B indicates the bypass flow path.

Further, the gas turbine engine 10 includes an outlet guide vane (OGV) assembly having multiple guide vanes 24 that are circumferentially-spaced and disposed within the core engine flow path 22 proximate to a downstream side of the low pressure compressor 16. The gas turbine engine 10 also includes multiple circumferentially-spaced support struts 30 positioned downstream from the multiple guide vanes 24 configured for supporting the fan hub frame 19. In operation, air flows through low pressure compressor 16 from an upstream side 26 of engine 10 and compressed air is supplied from low pressure compressor 16 through the core engine flow path 22 to the high pressure compressor 20. Compressed air is then delivered to a combustor assembly (not shown) where it is mixed with fuel and ignited. The combustion gases are channeled from combustor assembly to drive turbines.

Figure 3:
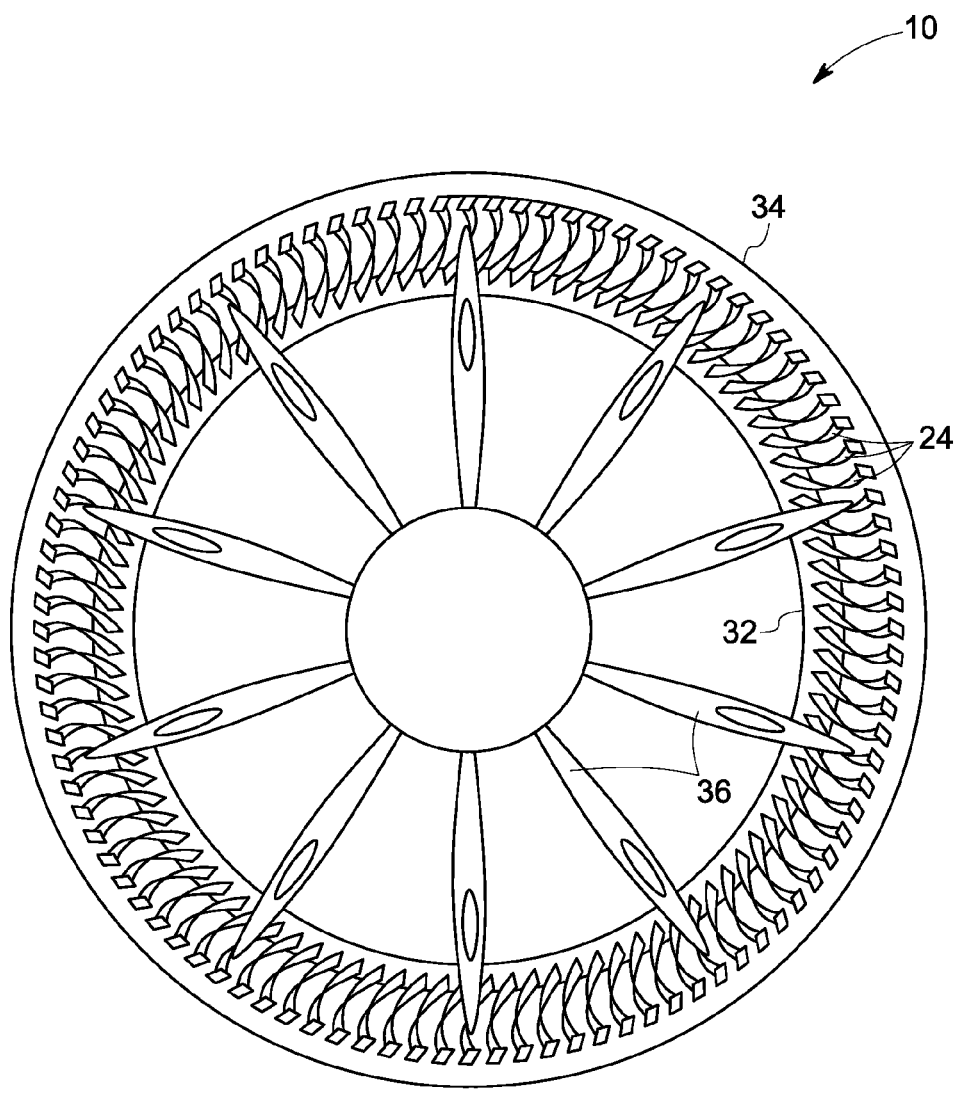
FIG. 3 is cross-section view of the gas turbine engine in accordance with an example of the present technology.
Figure 4:
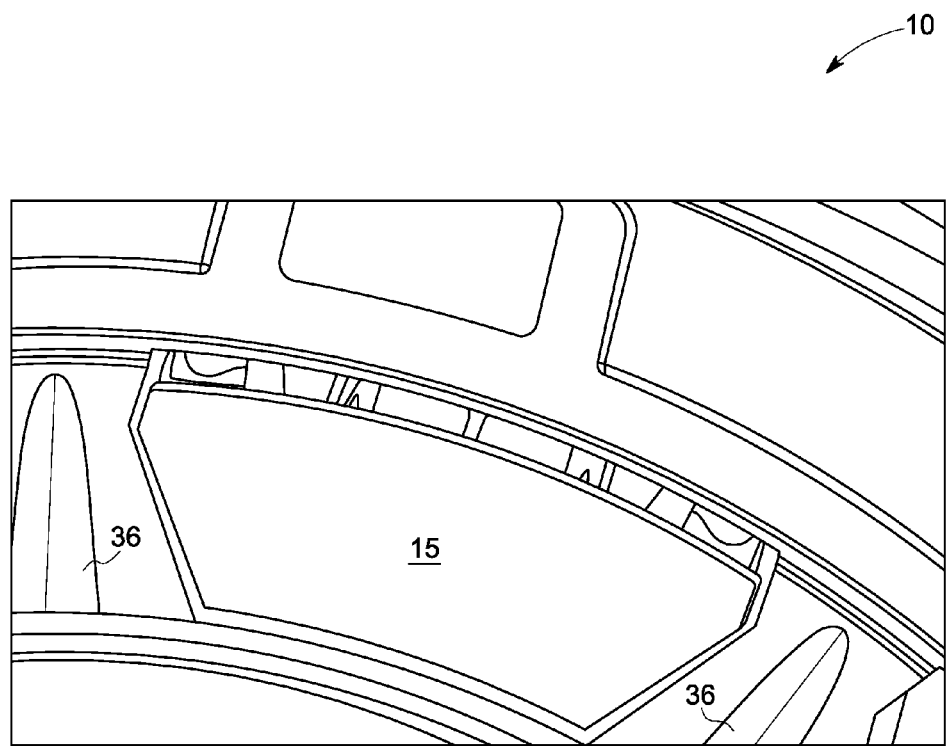
FIG. 4 shows a pair of adjacent support struts 36 arranged circumferentially having at least one VBV door in accordance with an example of the present technology.

Referring to FIG. 3 the gas turbine engine 10 includes an outlet guide vane (OGV) assembly having multiple guide vanes 24 that are circumferentially-spaced and disposed within the core engine flow path 22 between the inner engine casing 32 and the outer engine casing 34. The multiple guide vanes 24 may be positioned between flanges that are disposed with the inner and outer engine casings 32, 34. The gas turbine engine 10 also shows multiple circumferentially-spaced support struts 36 positioned downstream from the multiple guide vanes configured for supporting the fan hub frame 19. Each pair of adjacent support struts 36 arranged circumferentially includes at least one VBV door 15 therebetween as shown in FIG. 4.

Figure 5:
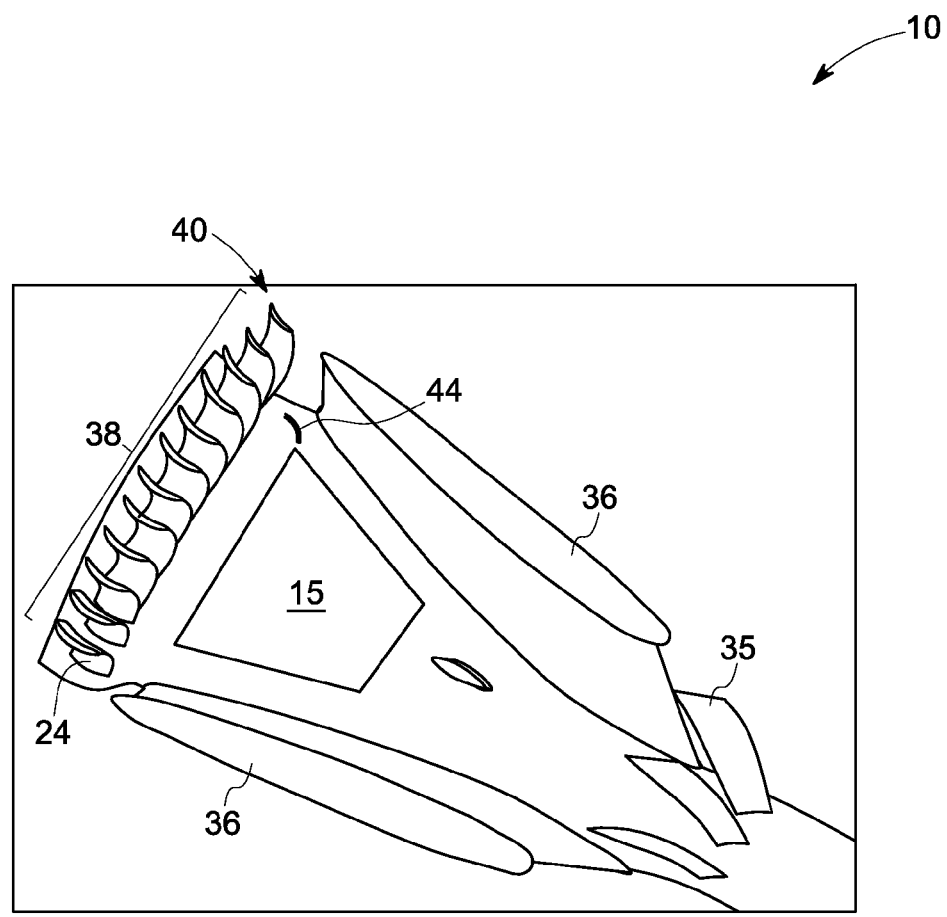
FIG. 5 is a top view of an annular section of the gas engine turbine illustrating the pair of adjacent support struts and at least one VBV door located between the pair of adjacent support struts of a fan hub frame in accordance with an example of the present technology.

FIG. 5 is a top view of an annular section of the gas engine turbine 10 illustrating the pair of adjacent support struts 36 and at least one VBV door 15 located between the pair of adjacent support struts 36 of a fan hub frame 19. Multiple inlet guide vanes 35 of the high pressure compressor 20 is shown to be located proximate to the downstream side of multiple support struts 36. As shown, a section 38 of the OGV assembly is located at the upstream side of the fan hub frame 19 before each pairs of adjacent support struts 36. The section 38 of the OGV assembly includes a first side 40 with one or more first guide vanes 42 with short trailing edges compared to the remaining plurality of guide vanes 24 of the section 38 of the OGV assembly. The one or more first guide vanes 42 are configured for directing flow into the at least one VBV door 15 without impacting the one or more first side guide vanes 42 at the first side 40. Further, in one embodiment, the first side 40 of the section 38 of the OGV assembly includes one or more guide channels 44 mounted on the outer casing proximate to the trailing edges of the one or more first side guide vanes 42 for deflecting flow and foreign particles in the fluid flowing into opening of the VBV door 15.

Figure 6:
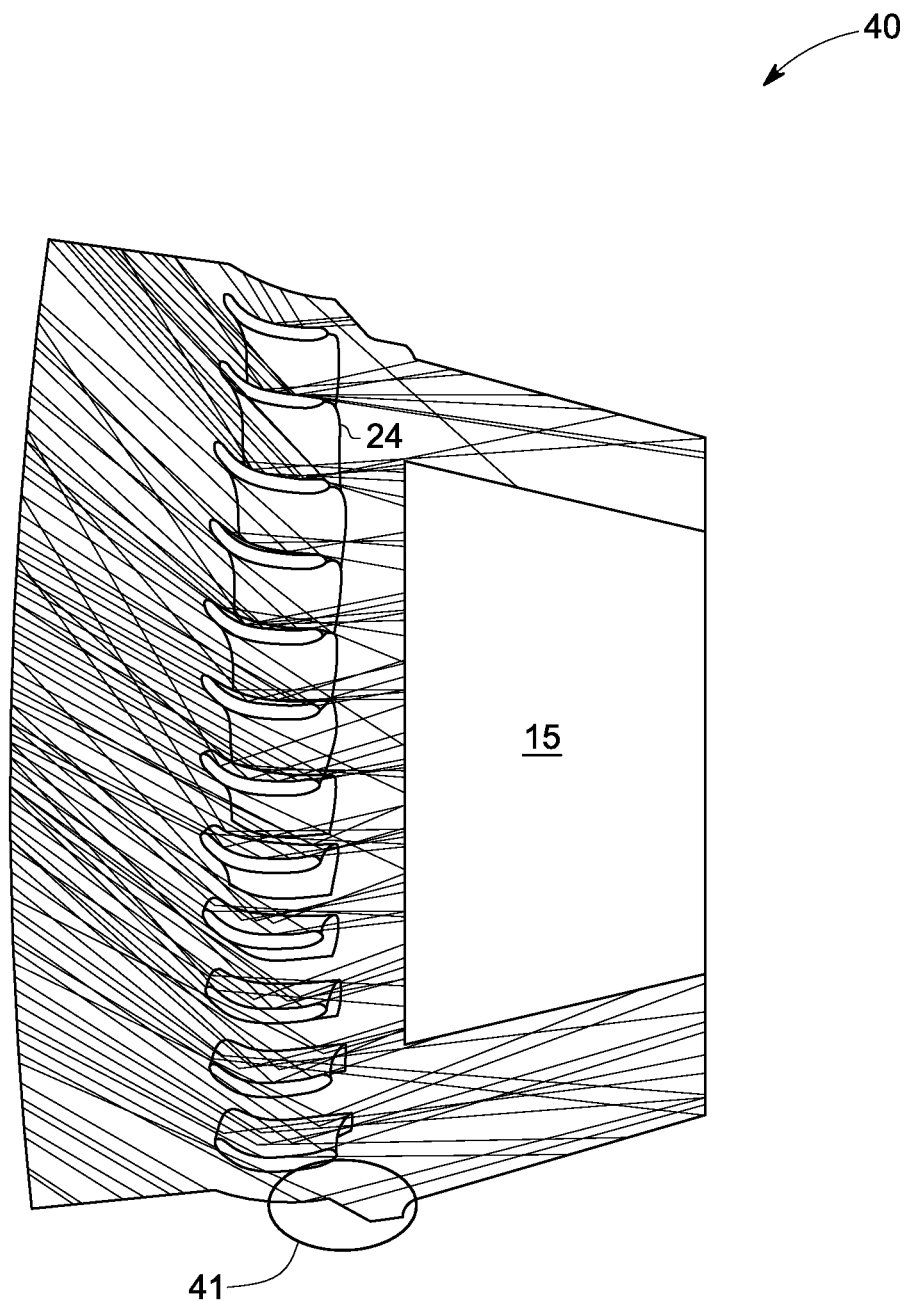
FIG. 6 shows a typical annular section of the gas engine turbine.

In a typical annular section of the gas engine turbine 10 as shown in FIG. 6, the trailing edges of the one or more guide vanes 24 at the first side 40 of section 38 of the OGV assembly are of the same dimension as remaining multiple guide vanes of the of section 38 of the OGV assembly and results in impacting of the foreign particles in the flow and rebounding from the one or more guide vanes. As shown, the foreign particles typically impact a portion of the fan hub frame 19 and may even skip the VBV door 15. At a second side 41, the flow of foreign particles is shown to rebound from the guide vanes 24 and gets deflected into the VBV doors 15.

Figure 7:
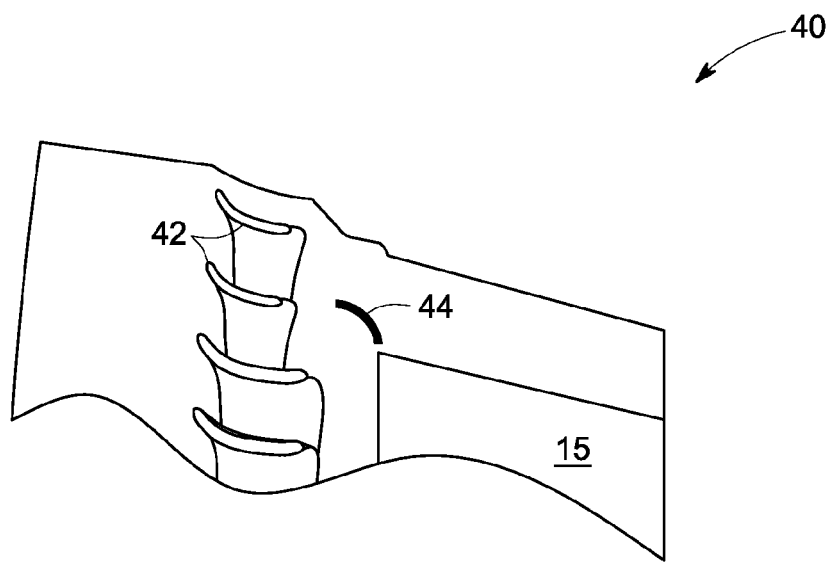
FIG. 7 is an enlarged view of a first side of the section of an OGV assembly in accordance with an example of the present technology.

FIG. 7 is an enlarged view of the first side 40 of the section 38 of the OGV assembly (shown in FIG. 5) in accordance with an example of the technology. As shown, the first side 40 includes the one or more first side guide vanes 42 that include shorter trailing edges as compared to other guide vanes 24 for allowing flow of fluids and foreign particles directly into the at least one VBV door 15. This prevents impacting the flow of fluids and foreign particles onto the one or more first side guide vanes 42. Further, the one or more guide channels 44 may be mounted at one or more different angles on the outer casing proximate to the trailing edges of the one or more first side guide vanes 42 such that the one or more guide channels 44 is able to deflect flow and foreign particles into the opening of the VBV door 15.

Figure 8:
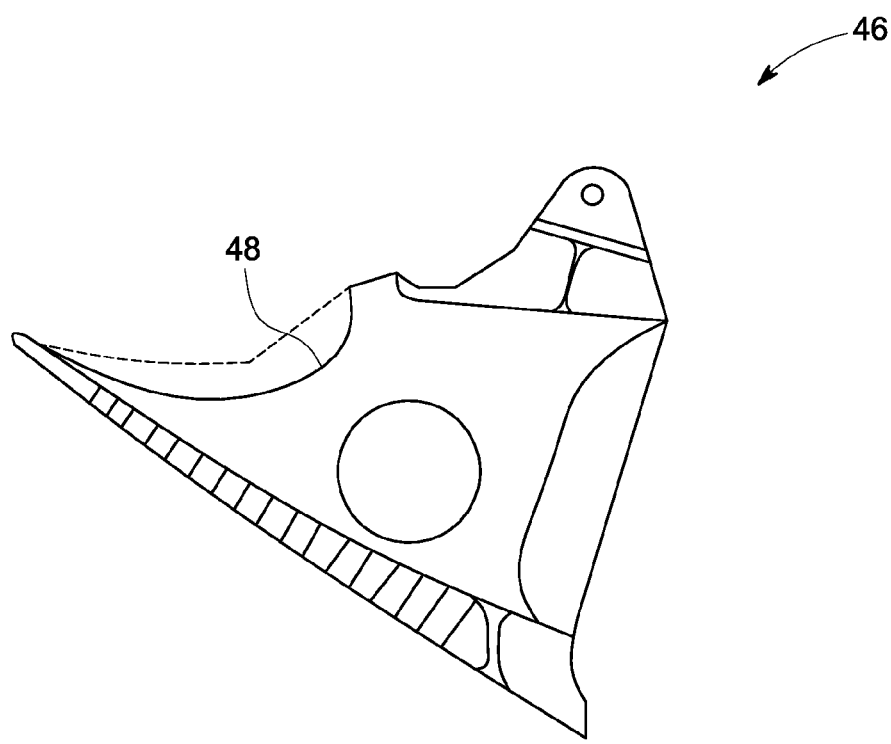
FIG. 8 is a side vide of one of the multiple VBV doors of the gas engine turbine in accordance with an example of the present technology.

FIG. 8 is a side vide of one of the multiple VBV doors 46 of the gas engine turbine 10 in accordance with an example of the present technology. In this example, the side walls of the VBV door 46 includes edges 48 that are pushed downstream of the core engine flow path for maximizing capture of the foreign particles.

Figure 9:
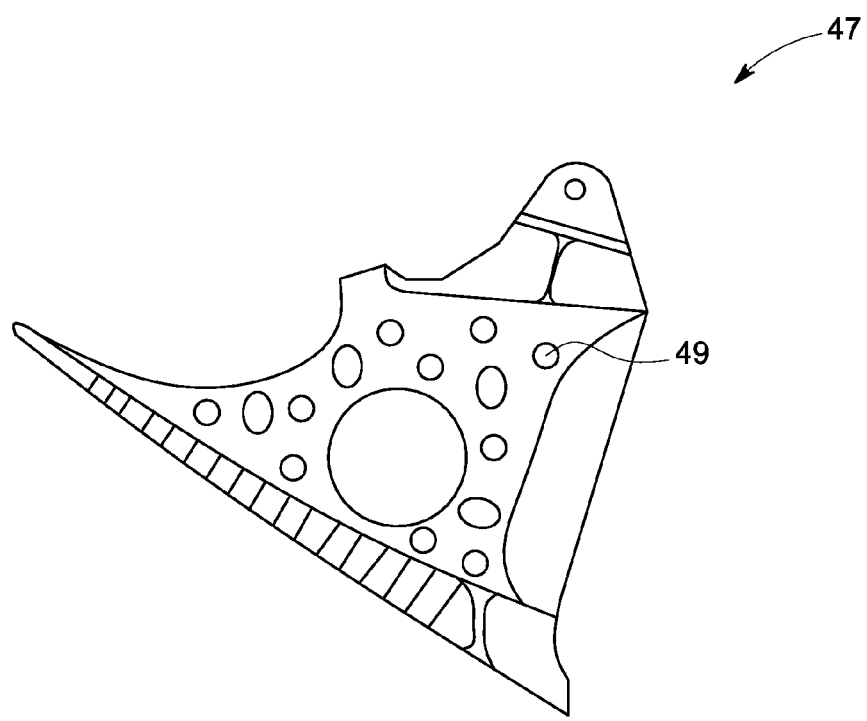
FIG. 9 is a side vide of one of the multiple VBV doors of the gas engine turbine in accordance with another example of the present technology.
Figure 10:
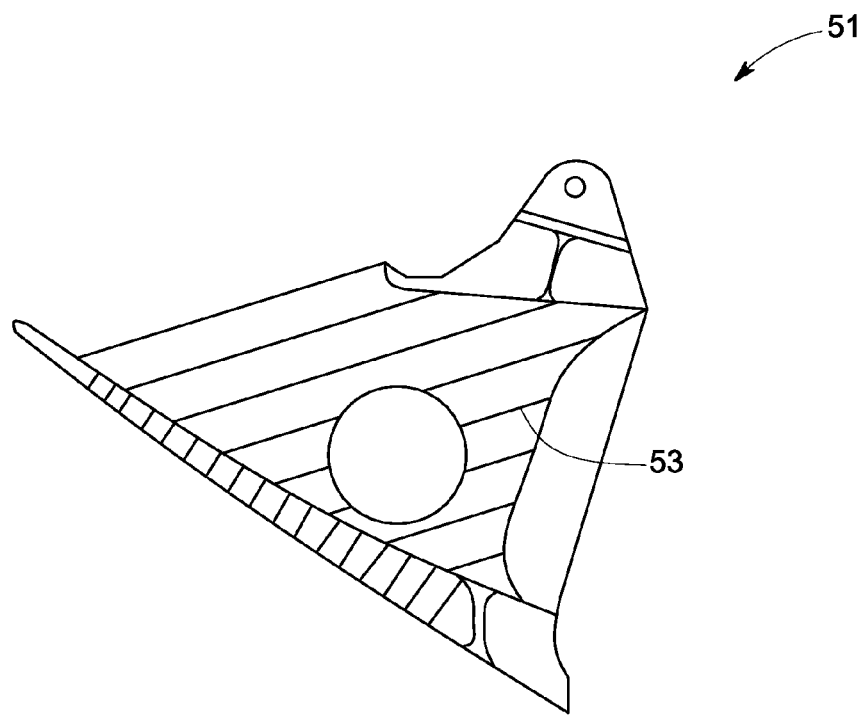
FIG. 10 is a side vide of one of the multiple VBV doors of the gas engine turbine in accordance with yet another example of the present technology.

In another example of the present technology, FIG. 9 shows a side view of one of multiple VBV doors 47 of the gas engine turbine having side walls that include multiple perforations 49 for allowing increased flow of foreign particles into the bypass flow path. In yet another example of the present technology, FIG. 10 shows a side view of one of multiple VBV doors 51 having side walls that include multiple trusses 53 to create passages for allowing increased flow of foreign particles and providing structural integrity to the VBV door 51.

Figure 11:
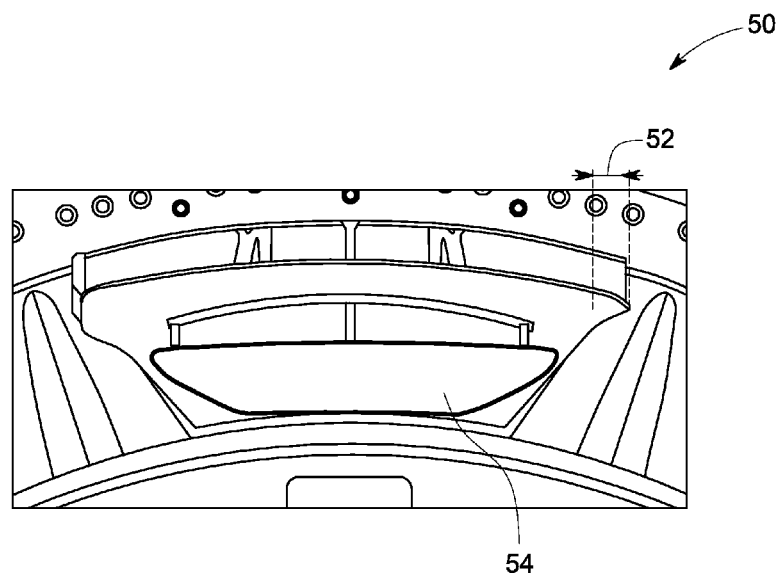
FIG. 11 is a portion of a gas turbine engine showing a front sectional view of one of the multiple VBV doors in accordance with an example of the present technology.

FIG. 11 is a portion of a gas turbine engine 10 showing a front sectional view of one of the multiple VBV doors 50 in accordance with an example of the present technology. Each VBV door 50 may include a first segment 52 and a second segment 54. In this example as shown, the first segment 52 of each of the multiple VBV doors 50 includes a circumferential width such that the multiple VBV doors 50 cover a circumferential span of 80% or more of annular compressor discharge having the core engine flow path. This allows increased extraction of foreign particles by the multiple VBV doors 50 of the gas turbine engine 10. The second segment 54 of the VBV door 50 can be actuated after first segment 52 is deployed. Since the concentration of the foreign particles is the highest at the casing, the first segment 52 can extract most of them.

Further, each of the multiple VBV doors 50 may be configured to expand an inlet area in a circumferential direction or in a radial direction for capturing increased flow from the core engine flow path. Each of the multiple VBV doors 50 is configured to allow an increased amount of flow by simultaneously opening of the inlet area both in the circumferential direction and in the radial direction. In another example, each of the multiple VBV doors 50 may be operated by independently opening of the inlet area in the circumferential direction at a first stage and in the radial direction in a second stage. For achieving this, each of the multiple VBV doors 50 includes one or more segments operating at one or more stroke positions. The first segment 52 may have a larger circumferential width than the second segment 54. While the second segment 54 may have a larger radial opening area than the first segment 52. The first segment 52 can be opened as part of a first actuation that can extract more particles due to larger circumferential extent of about 90% of the circumference between support struts (shown as 36 in FIG. 5). In a second actuation, the second segment 54 can dropdown for extracting particles as well as allowing required flow for stall-free operation of the turbine engine at low speed.

In another example, each of the VBV doors 50 are configured to move circumferentially during opening of the VBV door 50 based on flow direction for capturing the foreign matter present in the core engine flow path. The circumferential movement of the VBV doors may be achieved by any suitable actuation mechanism that can move the VBV doors in a desired direction for efficient extraction of foreign particles in the fluid flow of the core engine flow path.

Figure 12:
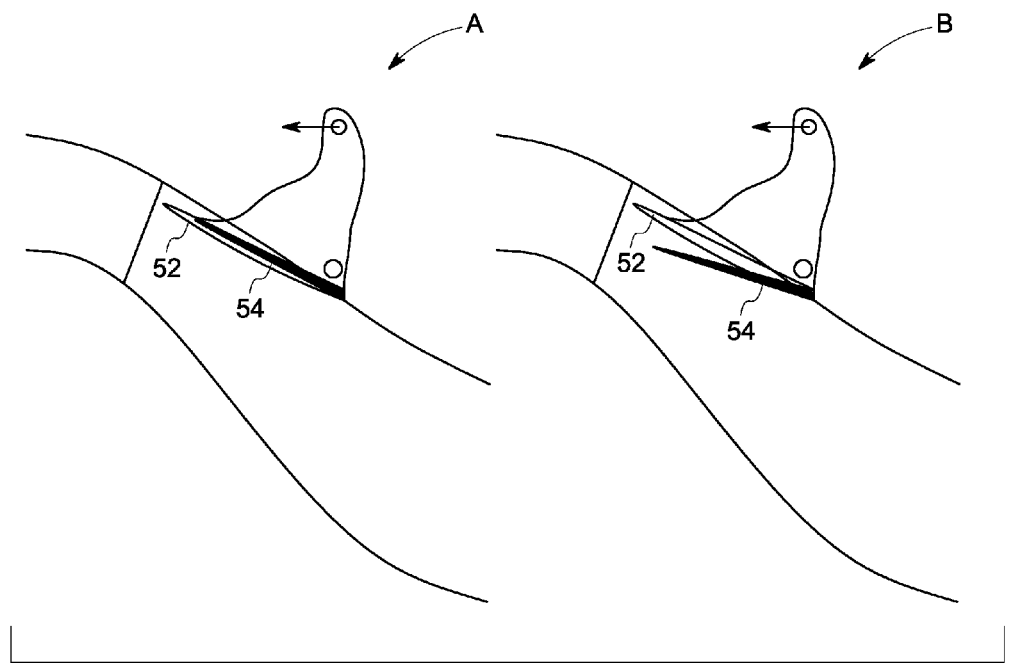
FIG. 12 shows a side view of a VBV door operating during a first stroke position and a second stroke position in accordance with an example of the present technology.

FIG. 12 shows a side view of the VBV door 50 operating the first segment 52 and the second segment 54 during a first stroke position A and a second stroke position B. In operation, the first stroke position A may be a smaller stroke position during which each of the plurality of VBV doors 50 are configured to operate both the first segment 52 and the second segment 54. At the second stroke position B which may be a larger stroke position, only the second segment 54 is deployed in order to avoid interference of the VBV doors with the fan hub frame.

Figure 13:
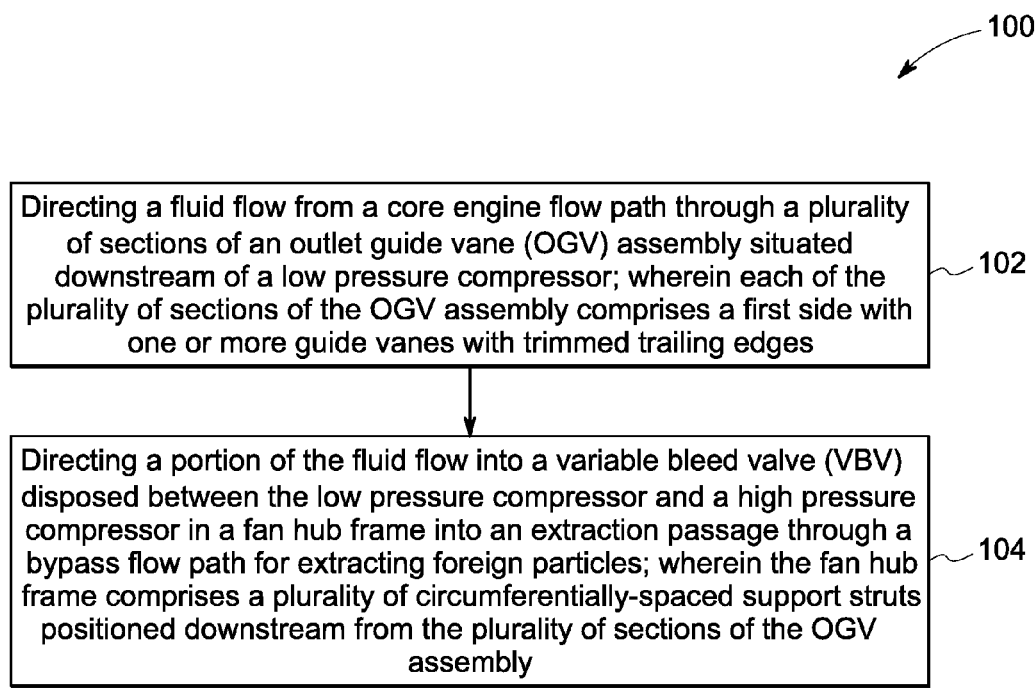
FIG. 13 is a flow chart of a method of extracting foreign particles by a gas turbine engine in accordance with an example of the present technology.

FIG. 13 is a flow chart of a method 100 of extracting foreign particles by a gas turbine engine in accordance with an example of the present technology. At step 102, the method includes directing a fluid flow from a core engine flow path through a plurality of sections of an outlet guide vane (OGV) assembly situated downstream of a low pressure compressor; wherein each of the plurality of sections of the OGV assembly comprises a first side with one or more first side guide vanes with short trailing edges compared to the remaining plurality of guide vanes of the section of the OGV assembly. Further, at step 104, the method includes directing a portion of the fluid flow into a variable bleed valve (VBV) disposed between the low pressure compressor and a high pressure compressor in a fan hub frame into an extraction passage through a bypass flow path for extracting foreign particles; wherein the fan hub frame comprises a plurality of circumferentially-spaced support struts positioned downstream from the plurality of sections of the OGV assembly.

The method includes deflecting fluid flow at the first side of the each of the plurality of sections of the OGV assembly into the at least one VBV door by one or more guide channels mounted on the outer casing proximate to the trailing edges of the plurality of guide vanes towards the first side of the section of the OGV assembly. The method may include moving the plurality of VBV doors in a circumferential direction based on flow direction at exit of the low pressure compressor during opening of the VBV door for capturing the foreign matter present in the core engine flow path. The method may include operating each of the plurality of VBV doors having a first segment and a second segment at one or more stroke positions, wherein at a first stroke position each of the plurality of VBV doors operates both the two segments. At this first stroke position, the second segment may be operated such that the second segment remains closed or opens up partially. At a second stroke position, each of the plurality of VBV doors operates only the second segment.

Advantageously, the present technology is directed towards improving extraction of the foreign particles by the variable bleed valves of the gas turbine engine. The extraction efficiency may improve by about 10% which may lead to 30% reduction of foreign matter ingestion in the high pressure compressor. Further, this may result in improved operability and durability of the gas turbine engine. Thus, the present technology leads to reduction in tip clearance due to sand erosion which further leads to reduction in performance loss over the time. Furthermore, the present invention results in improvement in scheduled product service and maintenance leading to cost saving.

Furthermore, the skilled artisan will recognize the interchangeability of various features from different examples. Similarly, the various methods and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular example. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While only certain features of the technology have been illustrated and described herein, many modifications and changes will occur to those skilled in the art. It is, therefore, to be understood that the appended claims are intended to cover all such modifications and changes as fall within the true spirit of the claimed inventions.

The invention claimed is:

1. A system for extracting foreign matter in a gas turbine, the system comprising:
    a core engine flow path bounded by an inner engine casing and an outer engine casing forming an annular compressor discharge;
    a plurality of variable bleed valve (VBV) doors disposed on the outer engine casing of a fan hub frame between a low pressure compressor and a high pressure compressor configured to bleed a portion of flow from the core engine flow path into a bypass flow path to extract foreign particles,
    an outlet guide vane (OGV) assembly comprising a plurality of guide vanes that are circumferentially-spaced and disposed within the core engine flow path proximate to a downstream side of the low pressure compressor, and
    a plurality of circumferentially-spaced support struts positioned downstream from the plurality of guide vanes configured to support the fan hub frame,
    wherein each pair of adjacent support struts comprises at least one VBV door therebetween and a section of the OGV assembly located at an upstream side of the fan hub frame before the each pair of adjacent support struts,
    wherein the section of the OGV assembly comprises a first side with one or more first side guide vanes with trailing edges that are shorter compared to the remaining plurality of guide vanes of the section of the OGV assembly and configured for directing flow into the at least one VBV door without impacting the one or more first side guide vanes at the first side.

2. The system of claim 1, wherein each of the plurality of VBV doors comprises side walls pushed downstream to expose increased area for allowing foreign particles to flow into the bypass flow path from sides of the section of the OGV assembly.

3. The system of claim 2, wherein the side walls comprise a plurality of perforations for allowing increased flow of foreign particles into the bypass flow path.

4. The system of claim 2, wherein the side walls comprise a plurality of trusses to create passages for allowing increased flow of foreign particles and providing structural integrity.

5. The system of claim 1, further comprising one or more guide channels mounted on the outer casing proximate to the trailing edges of the plurality of guide vanes towards the first side of the section of the OGV assembly to deflect particles into the opening of the VBV door.

6. The system of claim 1, wherein each of the VBV doors comprises a circumferential width for covering about 80% of annular compressor discharge having the core engine flow path.

7. The system of claim 1, wherein each of the plurality of VBV doors are configured to expand an inlet area in a circumferential direction or in a radial direction to capture increased flow from the core engine flow path.

8. The system of claim 1, wherein each of the plurality of VBV doors is configured to allow an increased amount of flow by simultaneously opening of the inlet area both in the circumferential direction and in the radial direction.

9. A gas turbine comprising:
    a core engine flow path bounded by an inner engine casing and an outer engine casing forming an annular compressor discharge;
    a plurality of variable bleed valve (VBV) doors disposed on the outer engine casing of a fan hub frame between a low pressure compressor and a high pressure compressor configured to bleed a portion of flow from the core engine flow path into a bypass flow path to extract foreign particles, wherein each of the plurality of valves comprises one or more segments configured to operate at one or more stroke positions;
    an outlet guide vane (OGV) assembly comprising a plurality of guide vanes that are circumferentially-spaced and disposed within the core flow path proximate to a downstream side of the low pressure compressor; and
    a plurality of circumferentially-spaced support struts positioned downstream from the plurality of guide vanes configured to support the fan hub frame,
    wherein each pair of adjacent support struts comprises at least one VBV door therebetween and a section of the OGV assembly located at an upstream side of the fan hub frame before the each pair of adjacent support struts, wherein the section of the OGV assembly comprises a first side with one or more first side guide vanes with trailing edges that are shorter compared to the remaining plurality of guide vanes of the section of the OGV assembly and configured for directing flow into the at least one VBV door without impacting the one or more first side guide vanes at the first side.

10. The gas turbine of claim 9, wherein each of the plurality of VBV doors comprises a first segment and a second segment.

11. The gas turbine of claim 10, wherein each of the plurality of VBV doors is configured to operate both the first segment and the second segment at a first stroke position.

12. The gas turbine of claim 11, wherein each of the plurality of VBV doors is configured to operate the second segment at a second stroke position.

13. The gas turbine of claim 9, wherein each of the plurality of VBV doors comprises side walls with edges pushed downstream of the core path to capture particles.

14. A gas turbine comprising:
    a core engine flow path bounded by an inner engine casing and an outer engine casing forming an annular compressor discharge;
    a plurality of variable bleed valve (VBV) doors disposed on the outer engine casing of a fan hub frame between a low pressure compressor and a high pressure compressor configured to bleed a portion of flow from the core engine flow path into a bypass flow path to extract foreign particles, wherein each of the plurality of valves comprises one or more segments configured to operate at one or more stroke positions;

an outlet guide vane (OGV) assembly comprising a plurality of guide vanes that are circumferentially-spaced and disposed within the core flow path proximate to a downstream side of the low pressure compressor; and a plurality of circumferentially-spaced support struts positioned downstream from the plurality of guide vanes configured to support the fan hub frame, wherein each pair of adjacent support struts comprises at least one VBV door therebetween and a section of the OGV assembly located at an upstream side of the fan hub frame before the each air of adjacent support struts, further comprising one or more guide channels mounted on the outer casing proximate to the trailing edges of the plurality of guide vanes towards the first side of the section of the OGV assembly to deflect particles in the fluid flow into the opening of the VBV door.

15. The gas turbine of claim 14, wherein each of the plurality of VBV doors comprises a first segment and a second segment.

16. The gas turbine of claim 15, wherein each of the plurality of VBV doors is configured to operate both the first segment and the second segment at a first stroke position.

17. The gas turbine of claim 16, wherein each of the plurality of VBV doors is configured to operate the second segment at a second stroke position.

18. The gas turbine of claim 14, wherein each of the plurality of VBV doors comprises side walls with edges pushed downstream of the core path to capture particles.

19. A method comprising:
directing a fluid flow from a core engine flow path through a plurality of sections of an outlet guide vane (OGV) assembly situated downstream of a low pressure compressor; wherein each of the plurality of sections of the OGV assembly comprises a first side with one or more first side guide vanes with trailing edges that are shorter compared to the remaining plurality of guide vanes of the section of the OGV assembly and configured to direct flow into at least one variable bleed valve (VBV) door without impacting the one or more first side guide vanes at the first side;

directing a portion of the fluid flow into a variable bleed valve (VBV) disposed between the low pressure compressor and a high pressure compressor in a fan hub frame into an extraction passage through a bypass flow path for extracting foreign particles; wherein the fan hub frame comprises a plurality of circumferentially-spaced support struts positioned downstream from the plurality of sections of the OGV assembly.

20. The method of claim 19, further comprising deflecting fluid flow at the first side of the each of the plurality of sections of the OGV assembly into the at least one VBV door by one or more guide channels mounted on the outer casing proximate to the trailing edges of the plurality of guide vanes towards the first side of the section of the OGV assembly.

21. The method of claim 19, further comprising moving the plurality of VBV doors in a counterclockwise direction or clockwise direction based on flow direction at an exit of low pressure compressor during opening of the VBV door for capturing the foreign matter present in the core engine flow path.

22. The method of claim 19, further comprising operating each of the plurality of VBV doors having two segments at one or more stroke positions.

23. The method of claim 22, wherein at a first stroke position each of the plurality of VBV doors operates both the two segments.

24. The method of claim 23, wherein at a second stroke position, each of the plurality of VBV doors operates one of the segments.

* * * * *